Patented June 30, 1931

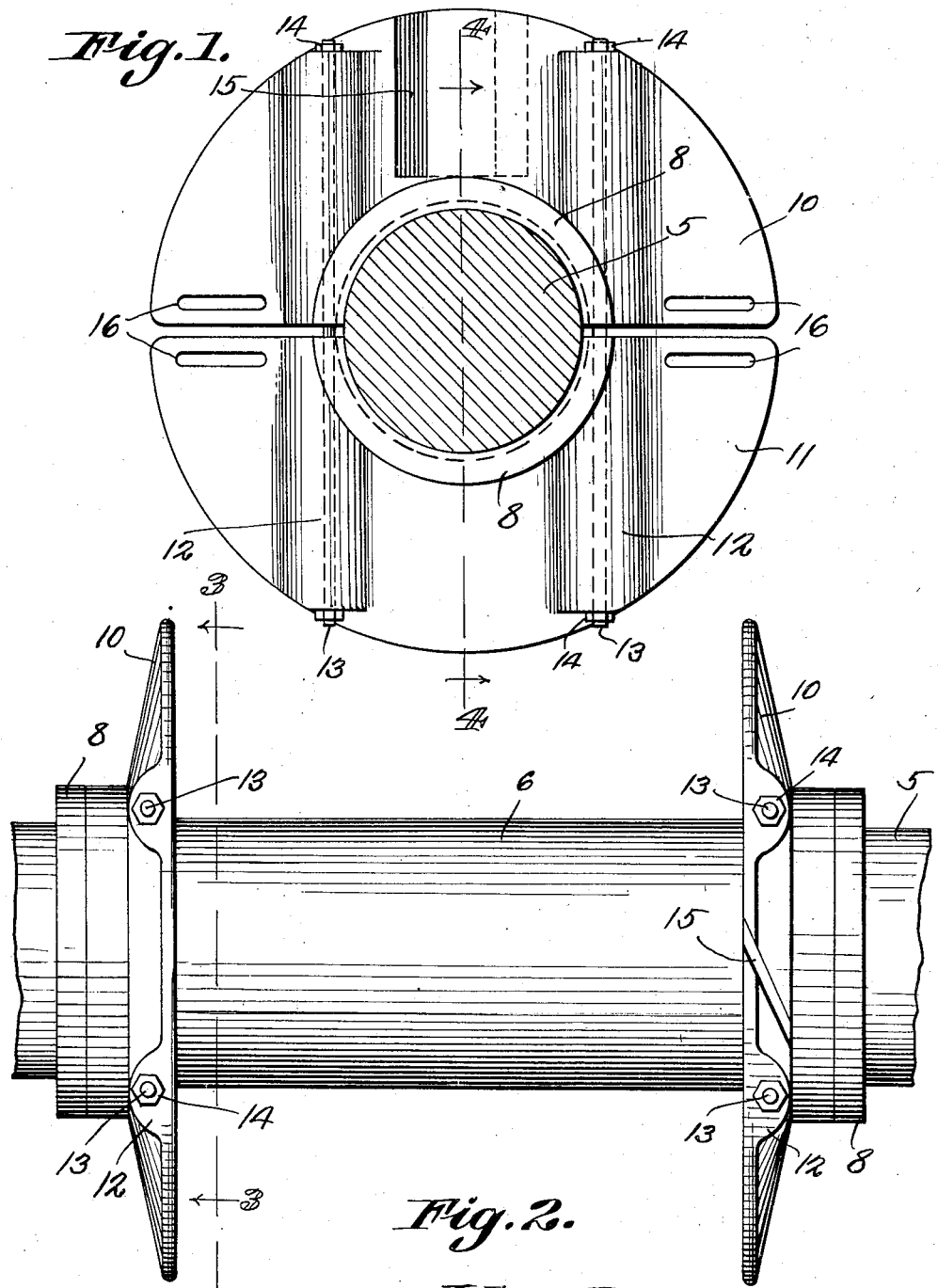

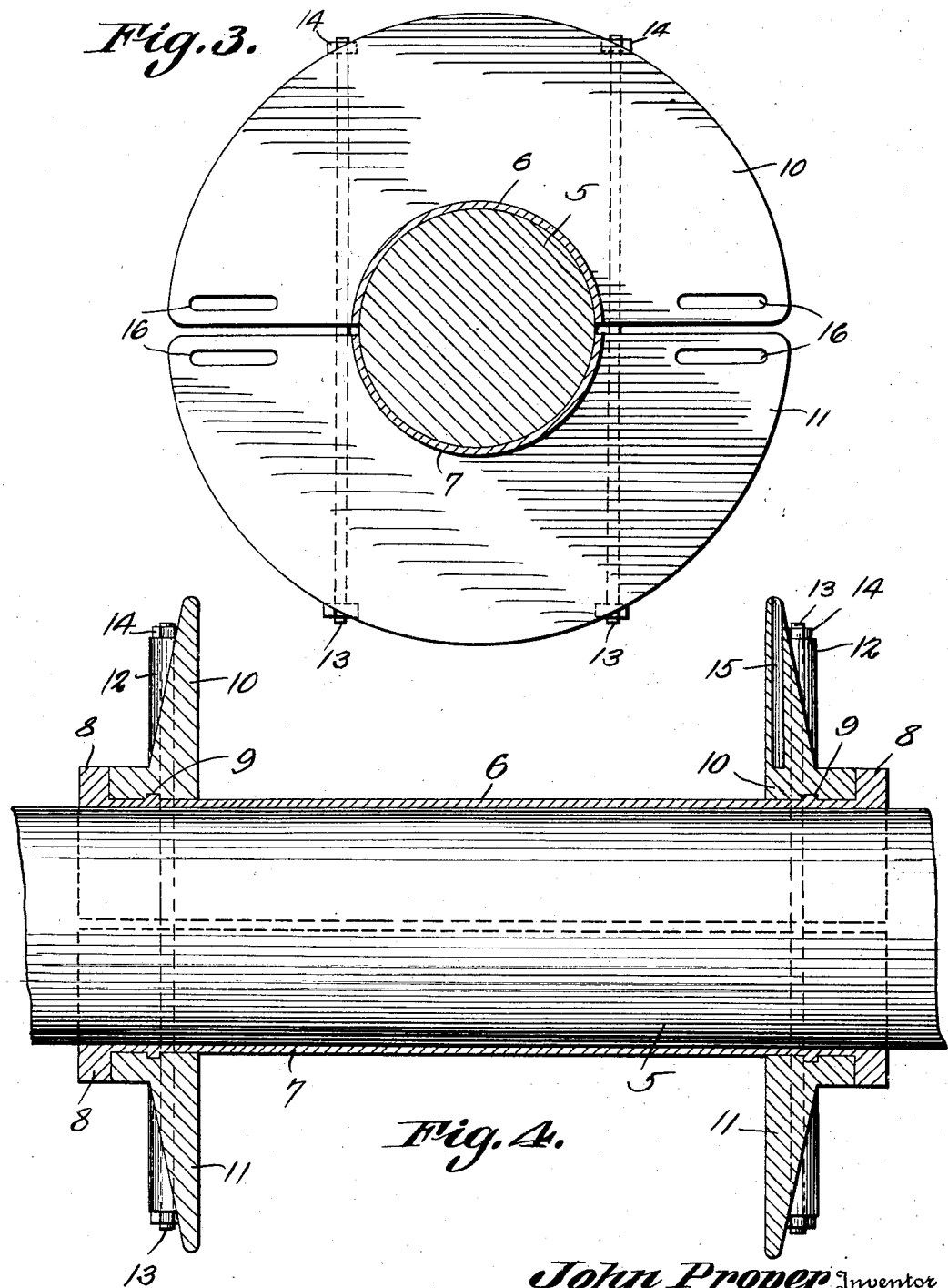

1,811,966

UNITED STATES PATENT OFFICE

JOHN PROPER, OF SEMINOLE, OKLAHOMA

BULL WHEEL SHAFT FLANGE

Application filed November 29, 1929. Serial No. 410,621.

This invention relates to the construction of flanges used in connection with bull wheel shafts of oil well drilling machinery for guiding the cable by which the drilling tools are manipulated.

The primary object of the invention is to provide flanges of this character which may be readily and easily secured to a bull wheel shaft, so that the flanges will be maintained in proper spaced relation with each other, eliminating lateral movement of the flanges when pulling a heavy load.

Another object of the invention is to provide a device of this character which may be adjusted or positioned on the shaft at such position as to insure the proper spooling of the cable or line.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:

Figure 1 is an end elevational view of a flange constructed in accordance with the invention.

Figure 2 is a side elevational view thereof.

Figure 3 is a sectional view taken on line 3—3 of Figure 2.

Figure 4 is a sectional view taken on line 4—4 of Figure 1.

Referring to the drawings in detail, the reference character 5 designates the bull wheel shaft of a machine used in drilling oil wells, and to which the flanges, forming the present invention, are secured.

The device embodies a sectional hub or tube, the sections of the hub or tube being indicated by the reference characters 6 and 7 respectively. These sections are of like construction, and include enlargements 8 disposed at the ends thereof and against which the flanges engage, to hold the flanges against lateral movement in one direction.

Disposed on the outer surface of each hub section and arranged in spaced relation with the enlargements 8 thereof, are ribs 9, which ribs are designed to fit into grooves formed in the inner surfaces of the flanges, to be hereinafter more fully described.

Each flange is sectional in formation, the sections being indicated by the reference characters 10 and 11 respectively, the sections being so constructed that when they are secured together, they will be disk-like in formation and of a width to permit a great quantity of cable or line to be wound therebetween.

Enlargements 12 are formed on each flange, the enlargements being formed with bores so that when the sections of the flanges are brought together, and the bores are brought into alignment, the bores will provide openings for the bolts 13 that are supplied with nuts 14, to the end that the sections of the flanges may be brought into close engagement with the sectional hub, holding the hub against movement on the shaft on which the device is positioned.

A groove 15 is formed diagonally across one of the flanges, the groove being of a width to accommodate the cable or line used in manipulating the drill tools so that the reserve supply of cable or line may be separated from the active portion of the line to facilitate adjustment of the active length of cable or line.

From the foregoing it will be obvious that due to this construction, the flanges will be maintained in proper spaced relation with each other at all times, eliminating any possibility of the flanges moving laterally or away from each other under a heavy load.

It might be further stated that openings 16 are provided in each flange section, the openings defining hand holds so that the sections may be easily handled.

I claim:

1. A flange for bull wheel shafts, including a sectional hub, enlargements at the ends of the sections, sectional flange members positioned on the sectional hub and engaging the enlargements to restrict lateral movement of the flanges, and means for securing the flanges and hub to the shaft.

2. A flange for bull wheel shafts, including a sectional hub, enlargements on the ends of the hub, ribs on the hub and disposed adjacent to the ends thereof, flange members, said flange members having grooves to receive the ribs to restrict movement of the flange members and bolts extending through the flange members for securing the flange members and hub sections to the shaft on which they are positioned.

In testimony that I claim the foregoing as my own, I have hereto affixed my signature.

JOHN PROPER.